United States Patent
Sasagawa (10) Patent No.: US 10,728,412 B2
(45) Date of Patent: Jul. 28, 2020

(54) IMAGE PROCESSING APPARATUS AND METHOD OF CONTROLLING THE SAME

(71) Applicant: CANON KABUSHIKI KAISHA, Tokyo (JP)

(72) Inventor: Naoto Sasagawa, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 16/389,090

(22) Filed: Apr. 19, 2019

(65) Prior Publication Data

US 2019/0356803 A1 Nov. 21, 2019

(30) Foreign Application Priority Data

May 16, 2018 (JP) .................................. 2018-094756

(51) Int. Cl.
*H04N 1/00* (2006.01)

(52) U.S. Cl.
CPC ..... *H04N 1/00928* (2013.01); *H04N 1/00411* (2013.01); *H04N 1/00973* (2013.01); *H04N 2201/0075* (2013.01)

(58) Field of Classification Search
CPC ........... H04N 1/00928; H04N 1/00973; H04N 2201/0075
See application file for complete search history.

(56) References Cited

U.S. PATENT DOCUMENTS

| 2013/0205153 A1* | 8/2013 | Yokoyama | G06F 1/3275 713/323 |
| 2014/0071477 A1* | 3/2014 | Akazawa | H04N 1/00891 358/1.14 |
| 2015/0004914 A1* | 1/2015 | Kusakabe | H04B 5/0056 455/41.3 |

FOREIGN PATENT DOCUMENTS

JP 2007320051 A 12/2007

* cited by examiner

*Primary Examiner* — Nicholas Pachol
(74) *Attorney, Agent, or Firm* — Carter, DeLuca & Farrell LLP (57) ABSTRACT

An image processing apparatus capable of fax communication and a method of controlling the image processing apparatus are described. The image processing apparatus has a user interface capable of accepting from a user, in advance of receiving by a network interface a shutdown request, a setting of whether or not to perform shutdown processing based on the received shutdown request when the image processing apparatus is in a state of being connected to a fax line and when fax communication is possible. The image processing apparatus executes, in accordance with the setting accepted in advance from the user by the user interface, the shutdown processing of the image processing apparatus based on the shutdown request received from the external apparatus.

6 Claims, 9 Drawing Sheets

IMAGE PROCESSING APPARATUS AND METHOD OF CONTROLLING THE SAME

BACKGROUND OF THE INVENTION

Field of the Invention

The present invention relates to an image processing apparatus and a method of controlling the same.

Description of the Related Art

In recent years, an image processing apparatus provided with a so-called remote shutdown function for shutting down the image processing apparatus over a network from an external terminal such as a server or a personal computer has been developed. By this, it is possible for a user to instruct a shutdown from a remote user interface (RUI) which is displayed on a Web browser of the external terminal by accessing an IP address of the image processing apparatus, for example. Alternatively, it is also possible for the user to instruct the shutdown of the image processing apparatus from an application that operates on the external terminal. By virtue of this function, because an administrator who manages many image processing apparatuses or an image processing apparatus at an isolated location can shut down a desired image processing apparatus without directly going to the location of the corresponding apparatus, it is possible to greatly reduce a burden for the administrator.

A fax (short for facsimile) function for transmitting/receiving data with a remote apparatus via a communication line (hereinafter referred to as a fax line) such as a telephone line typified by a PSTN (Public Switched Telephone Network) is also widely spread in image processing apparatuses. In a state where the power supply of such an image processing apparatus is off, receiving a fax is not possible. If an image processing apparatus is shut down from an isolated location by the remote shutdown function, there is a risk that a user who is currently using the image processing apparatus will not notice that fax reception is not possible. Consequently, if an image processing apparatus is being used for the reception of a fax, a user may desire for the image processing apparatus to be removed from targets of the remote shutdown function.

Japanese Patent Laid-Open No. 2007-320051 describes that when a shutdown is instructed from an RUI (Remote User Interface) of an image processing apparatus, if the image processing apparatus has a fax function, it is conveyed to a user that the target image processing apparatus has a fax function in a browser display. By this, the user is allowed to confirm whether or not to shut down the target image processing apparatus.

In the foregoing conventional technique, if an image processing apparatus which is a target of remote shutdown has a fax function, a user can select whether or not to shut down the image processing apparatus. However, it is not necessarily the case that a user is able to determine whether or not the image processing apparatus is used to receive faxes or whether or not the image processing apparatus may be shut down with just the information that the image processing apparatus has a fax function.

SUMMARY OF THE INVENTION

An aspect of the present invention is to eliminate the above-mentioned problem with conventional technology.

The feature of the present invention is to provide a technique so that, if an image processing apparatus is able to transmit/receive data via a fax line, the image processing apparatus does not perform shutdown processing in response to a shutdown request against a user's intention.

According to a first aspect of the present invention, there is provided an image processing apparatus capable of fax communication, comprising: a network interface that receives information from an external apparatus; a user interface that accepts a setting from a user; a controller, having at least one processor which executes instructions stored in a memory, one or more circuitry, or, a combination of the at least one processor and the one or more circuitry, being configured to: accept from a user, in advance of receiving by the network interface a shutdown request from the external apparatus, a setting of whether or not to perform shutdown processing based on the shutdown request received by the network interface when the image processing apparatus is in a state of being connected to a line for fax communication and when fax communication is possible; and execute, in accordance with the setting accepted in advance from the user by the user interface, the shutdown processing of the image processing apparatus based on the shutdown request received from the external apparatus.

According to a second aspect of the present invention, there is provided an image processing apparatus capable of communication with an external apparatus, the image processing apparatus comprising: a network interface that receives a shutdown request from the external apparatus; a controller, having at least one processor which executes instructions stored in a memory, one or more circuitry, or, a combination of the at least one processor and the one or more circuitry, being configured to: determine whether or not the image processing apparatus is capable of data transmission and reception via a fax line; and control to perform shutdown processing, when the network interface has received the shutdown request, wherein the controller does not execute the shutdown processing based on the shutdown request when it is determined that the data transmission and reception via the fax line is possible, and wherein the controller executes the shutdown processing of the image processing apparatus based on the shutdown request when it is determined that the data transmission and reception via the fax line is not possible.

According to a third aspect of the present invention, there is provided a method of controlling an image processing apparatus capable of fax communication with an external apparatus, the method comprising: accepting from a user, in advance of receiving a shutdown request for executing shutdown processing of the image processing apparatus from an external apparatus via a network, a setting of whether or not to perform the shutdown processing based on the shutdown request received when the image processing apparatus is in a state of being connected to a line for fax communication and when fax communication is possible; and receiving the shutdown request from the external apparatus via the network; executing, in accordance with the setting accepted in advance from the user, the shutdown processing of the image processing apparatus based on the shutdown request received from the external apparatus.

According to a fourth aspect of the present invention, there is provided a method of controlling an image processing apparatus capable of communicating with an external apparatus, the method comprising: receiving a shutdown request from the external apparatus; determining whether or not the image processing apparatus is capable of data transmission and reception via a fax line; and performing control to, when the shutdown request is received, not execute shutdown processing based on the shutdown request in a case that it is determined that the data transmission and reception via the fax line are possible, and execute the shutdown processing of the image processing apparatus based on the shutdown request in a case that it is determined that the data transmission and reception via the fax line are not possible.

Further features of the present invention will become apparent from the following description of exemplary embodiments with reference to the attached drawings.

BRIEF DESCRIPTION OF THE DRAWINGS

The accompanying drawings, which are incorporated in and constitute a part of the specification, illustrate embodiments of the invention, and together with the description, serve to explain the principles of the invention.

DESCRIPTION OF THE EMBODIMENTS

Embodiments of the present invention will be described hereinafter in detail, with reference to the accompanying drawings. It is to be understood that the following embodiments are not intended to limit the claims of the present invention, and that not all of the combinations of the aspects that are described according to the following embodiments are necessarily required with respect to the means to solve the problems according to the present invention.

First Embodiment

Figure 1:
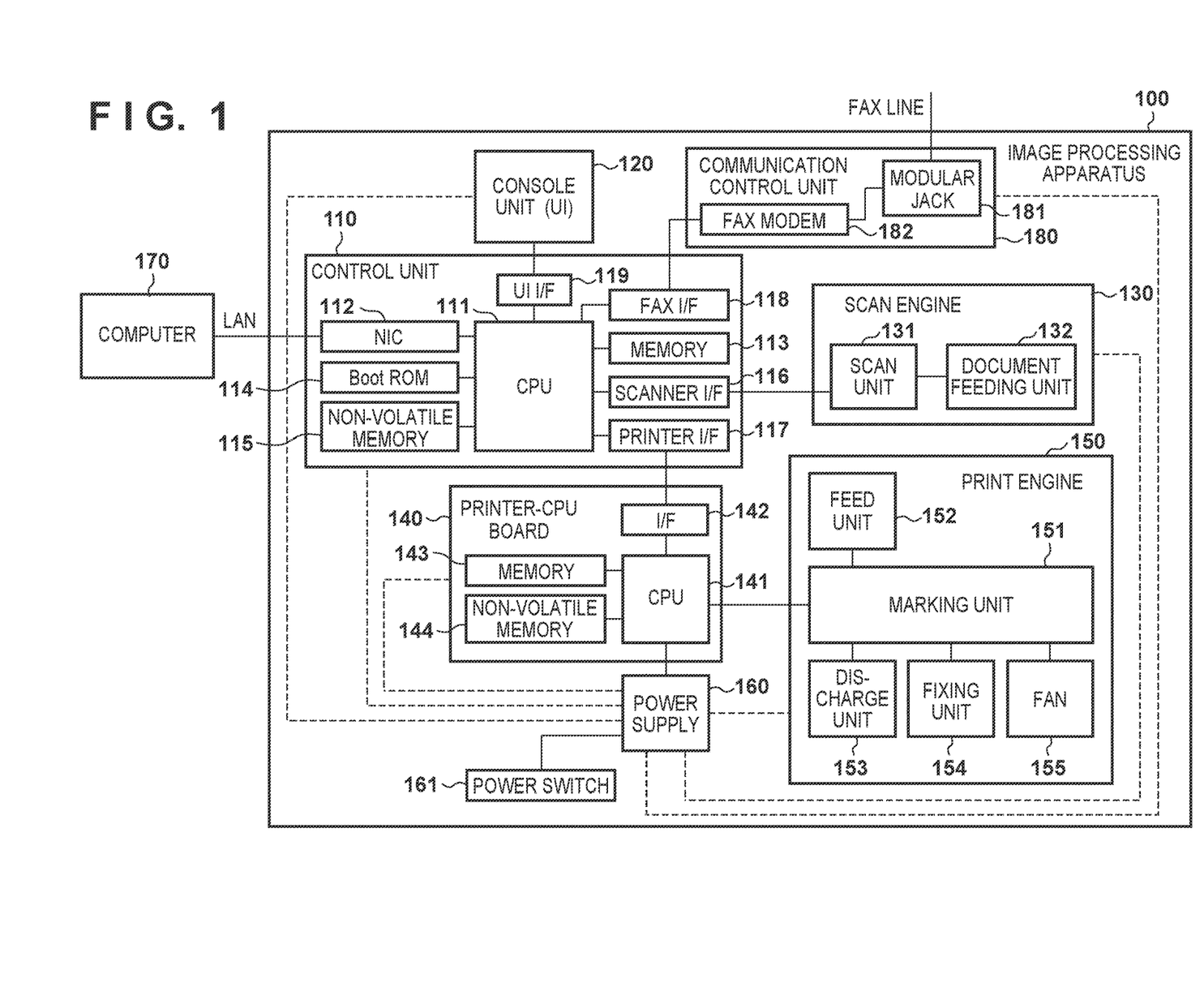
FIG. 1 is a block diagram for describing a configuration of hardware of an image processing apparatus according to a first embodiment.

FIG. 1 is a block diagram for describing a configuration of hardware of an image processing apparatus 100 according to a first embodiment.

The image processing apparatus 100 is a so-called multi-function printer (Multi-Function Peripheral (MFP)) that is provided with a scan engine 130 and a print engine 150. In addition, the image processing apparatus 100 is provided with a control unit 110, a console unit 120, a printer-CPU board 140, a communication control unit 180, a power supply 160, and a power switch 161. The scan engine 130 is provided with a scan unit 131 and a document feeding unit 132. The print engine 150 is provided with a marking unit 151, a feed unit 152, a discharge unit 153, a fixing unit 154, and a fan 155.

The scan engine 130 has the scan unit 131 for optically scanning a document and converting it to digital image data, and the document feeding unit 132 onto which a document bundle is placed and which is capable of feeding one document at a time, and transmits obtained digital image data to the control unit 110. The print engine 150 has the marking unit 151 for printing image data on a fed sheet, the feed unit 152 capable of separately feeding one sheet at a time from a sheet bundle, and the discharge unit 153 that discharges a sheet that has been printed to. Furthermore, the print engine 150 is provided with the fixing unit 154 which is for, in accordance with heat and pressure, fixing a toner image that was transferred on a sheet by the marking unit 151, and the fan 155 which is for cooling.

The communication control unit 180 has a modular jack 181 for connecting to a fax line, and a FAX modem 182. The modular jack 181 is a connector for connecting the image processing apparatus 100 to a fax line. The FAX modem 182 modulates data to be transmitted, and demodulates a received analog signal. FIG. 1 illustrates a model that has a fax function, but there are models that do not have the fax functions, and there are cases where such models do not have the communication control unit 180. The console unit 120 is a user interface (UI) for operating the image processing apparatus 100 and is connected to the control unit 110 via a UI interface 119.

The control unit 110 is connected to these components, and executes jobs on the image processing apparatus 100. The control unit 110 is a general-purpose CPU system, and is provided with a CPU 111 for controlling the entirety of the CPU board, a memory 113 which the CPU 111 uses as a work memory, and a boot ROM 114 in which a boot program is included. Furthermore, it is provided with an NIC 112 for making a network connection with an external unit, and a non-volatile memory 115 in which firmware is included. The CPU 111 executes the boot program of the ROM 114 to deploy a program stored in the non-volatile memory 115 to the memory 113, and executes the program deployed into the memory 113 to thereby control the image processing apparatus 100. The non-volatile memory 115 may be incorporated on the CPU board, and may be connected to the CPU board. In addition, the scan engine 130, the printer-CPU board 140, and the communication control unit 180 are respectively connected to the control unit 110 via the scanner I/F 116, the printer I/F 117, and the fax I/F 118.

The printer-CPU board 140 is provided with an interface 142 for connecting to the control unit 110, a CPU 141 for controlling the entirety of the board 140, a memory 143 which the CPU 141 uses as a work memory, and a non-volatile memory 144 which stores, for example, a program that the CPU 141 executes.

Dashed lines in FIG. 1 indicate power supply lines. The power supply 160 supplies power to the control unit 110, the console unit 120, the scan engine 130, the printer-CPU board 140, the print engine 150, and the communication control unit 180. The power switch 161 is a hardware switch for instructing on and off of the supply of power. When the power switch 161 is turned on, the CPU 111 executes the boot program of the boot ROM 114, and deploys the program stored in the non-volatile memory 115 to the memory 113. By the CPU 111 executing the deployed program, various hardware settings and activation of an OS is performed, and by the CPU 111 operating in accordance with the program deployed to the memory 113, processing such as accepting or executing a job becomes possible.

If the power switch 161 is pressed when the image processing apparatus 100 is operating, the image processing apparatus 100 executes shutdown processing, and enters a state where supply of power from the power supply 160 to each unit of the image processing apparatus 100 is completely stopped.

The image processing apparatus 100 is connected, so as to be able to communicate by HTTP, with a computer (PC) 170, which is an external terminal, through a network, via a NIC (network interface card) 112 which is installed in the control unit 110. The image processing apparatus 100 can accept input and output of digital image data with respect to the PC 170, issuance of a job, or an instruction to a device, for example.

Next, description is given regarding operation of the image processing apparatus 100.

As operation of the image processing apparatus 100, firstly description is given for an example of a copy job (an image copy in accordance with a sheet device).

When a user instructs execution of a copy job from the console unit 120, the CPU 111 of the control unit 110 accepts the instruction, and the CPU 111 starts execution of a job control program. In accordance with a scan engine control program called from the job control program, the CPU 111 causes the scan engine 130 to read an image of a document via the scanner I/F 116. The scan engine 130 optically scans the document, converts an image thereof to digital image data, and then transmits the image the digital image data to the control unit 110. The digital image data is temporarily saved in the memory 113. When a certain region of the memory 113 is filled by the digital image data, the CPU 111 calls a print engine communication program from the job control program. In accordance with the print engine communication program, the CPU 111 issues a print command to the CPU 141 of the printer-CPU board 140 via the printer I/F 117.

The CPU 141 operates in accordance with the print engine control program, and controls the print engine 150 to cause it to print an image based on image data. A toner image printed by the marking unit 151 is fixed to a sheet by the fixing unit 154. The fixing unit 154 fixes the toner image to the sheet by heat and pressure. Temperature adjustment of the fixing unit 154 is performed by the CPU 141 of the printer-CPU board 140 executing a power supply control program which is called by the print engine control program, and controlling an output of the power supply 160. In addition, the print engine 150 is provided with the fan 155 which is for suppressing a temperature rise due to, for example, heat emitted by the fixing unit 154. Similarly to temperature adjustment of the fixing unit 154, operation of the fan 155 is performed in accordance with the CPU 141 controlling an output of the power supply 160.

In the image processing apparatus 100 according to the first embodiment, the print engine control program and the power supply control program are executed by the same CPU 141, and the print engine control program decides operation of the power supply control program. It is desirable for operation of the power supply 160 to be controlled after ascertaining operation of the print engine 150. By the print engine control program being responsible for both of the print engine 150 and the power supply control program (in other words control of the power supply 160), control of the power supply 160 is simple and accurate. In addition, even if a problem occurs for the control unit 110 or the like, because the printer-CPU board 140 can control the print engine 150 and the power supply 160, for example, it is possible to prevent the occurrence of a fire due to the generated heat of the fixing unit 154.

Next, description is given regarding operation of a case of executing a shutdown of the image processing apparatus 100 through a network, from the PC 170 which is an external terminal.

Figure 3A:
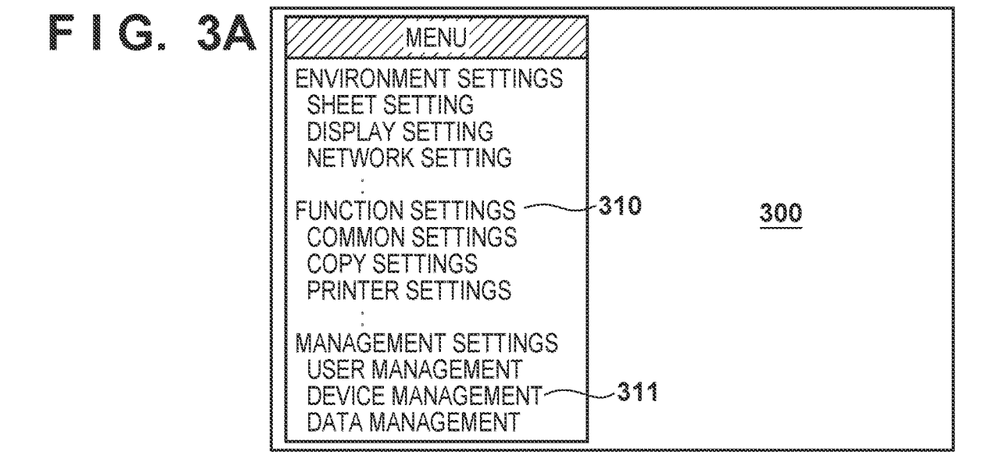
FIGS. 3A to 3F depict views illustrating examples of operation screens displayed by a Web browser of a PC when the performance of a shutdown is instructed from an RUI of the image processing apparatus according to the first embodiment.

When a Web browser installed in the PC 170 accesses an IP address of the image processing apparatus 100 by the HTTP protocol, the CPU 111 of the control unit 110 receives an HTTP request via the NIC 112. The CPU 111 executes an RUI program to thereby transmit an HTTP response to the PC 170, and cause an RUI 300 (FIG. 3) to be displayed on the Web browser of the PC 170. When a user who operates the PC 170 performs an operation such as clicking on the RUI 300 displayed on the Web browser, an HTTP request is transmitted from the PC 170 to the control unit 110 through the network. The CPU 111, which receives this, returns an HTTP response to the PC 170, and causes the Web browser to display a new dialog box. The user is able to instruct the image processing apparatus 100 to shut down by operating the RUI 300 displayed on the Web browser.

In the image processing apparatus 100 according to the first embodiment, control of the supply of power such as turning the power supply 160 on and off is managed by the printer-CPU board 140 which is different from the control unit 110. In other words, it is possible to make an operation to turn the power supply 160 on and off from the printer-CPU board 140, in addition to directly operating the power switch 161. Consequently, when the control unit 110 receives a shutdown request through the network, information thereof must be conveyed to the printer-CPU board 140. Accordingly, when a communication error occurs between the control unit 110 and the printer-CPU board 140, it is not possible to convey a shutdown request from the control unit 110 to the printer-CPU board 140. In other words, it ceases to be possible to perform a shutdown of the image processing apparatus 100 even if the control unit 110 has received the shutdown request through the network.

Accordingly, in the image processing apparatus 100 according to the first embodiment, the state of communication between the control unit 110 and the print engine 150, through the printer-CPU board 140, is stored in the non-volatile memory 115 of the control unit 110. The state of communication with the print engine 150 is set to "TRUE" in a normal state. If a communication error has occurred between the control unit 110 and the printer-CPU board 140, the CPU 111 operates in accordance with the print engine communication program to set the state of communication with the print engine 150 to "FALSE". When a communication error between the control unit 110 and the printer-CPU board 140 is resolved, the CPU 111 operates in accordance with the print engine communication program to update the state of communication with the print engine 150 to "TRUE".

Figure 2A:
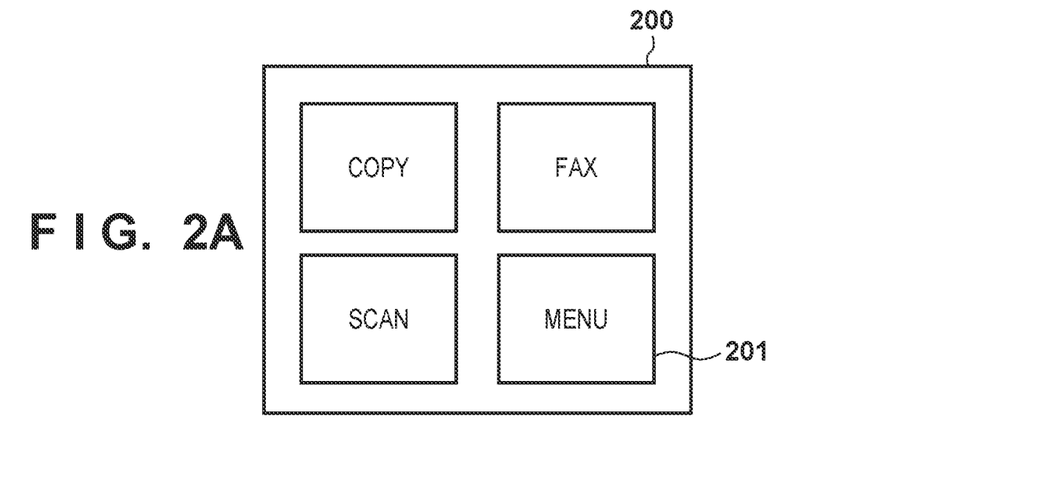
FIGS. 2A to 2C depict views illustrating examples of screens for performing setting relating to a remote shutdown, in the image processing apparatus according to the first embodiment.
Figure 2B:
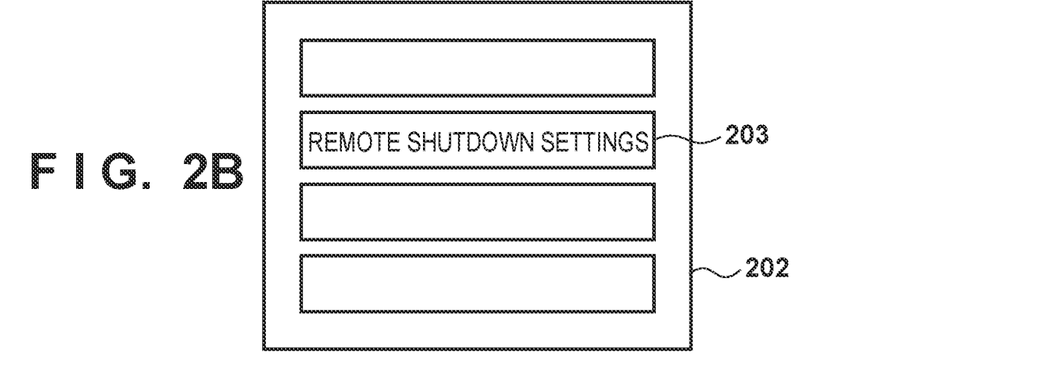
Figure 2C:
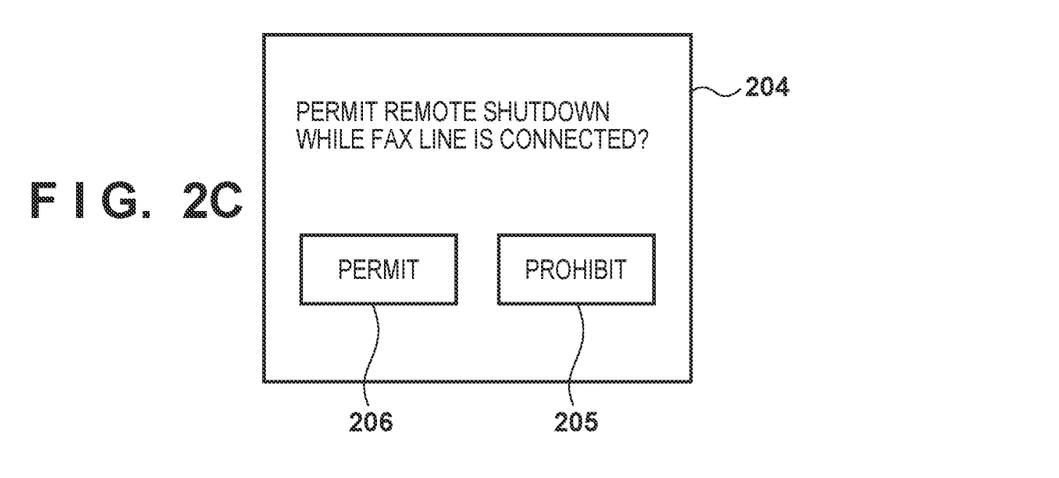

FIGS. 2A to 2C depict views illustrating examples of screens for performing setting relating to a remote shutdown, in the image processing apparatus 100 according to the first embodiment. These screens are displayed on a display unit of the console unit 120. Description is given regarding a method of setting whether or not to permit execution of a shutdown of the image processing apparatus 100 through the network, when a fax line is connected. The connection of a fax line indicates a state where a fax line is physically inserted into the modular jack 181 of the communication control unit 180, and it is possible to transmit/receive a fax.

FIG. 2A depicts a view that illustrates an example of a home screen 200 which is displayed on the console unit 120 of the image processing apparatus 100. When a menu button 201 of the home screen 200 is selected, a menu screen 202 of FIG. 2B is displayed. When a "remote shutdown settings" button 203 of the menu screen 202 is selected, a setting screen 204 of FIG. 2C is displayed. Via the setting screen 204, a user is able to select whether or not to permit a remote shutdown when a fax line is connected.

In a case of using the image processing apparatus 100 as a facsimile device, it is necessary to connect a fax line to the communication control unit 180 of the image processing apparatus 100. In a case of using the image processing apparatus 100 as a facsimile device and not wishing to have the image processing apparatus 100 be shut down from an external apparatus via a network, a prohibition button 205 of FIG. 2C is selected to prohibit a remote shutdown while a fax line is connected. In contrast, if the image processing apparatus 100 is not being used as a facsimile device and there is no problem even if it is subject to a remote shutdown, a permission button 206 of FIG. 2C is selected to permit a remote shutdown while a fax line is connected. In addition, because the image processing apparatus 100 is in a state where the fax function cannot be used if a fax line is not connected, the image processing apparatus 100 may be shut down from an external apparatus via a network regardless of this setting.

In the first embodiment, it is possible to set whether to permit or prohibit a remote shutdown from the menu button 201 of the home screen 200 without authorization, but configuration may be taken to require an administrator authority for the setting. In addition, configuration may be taken to provide a setting for whether to permit or prohibit a remote shutdown in a mode that is displayed in accordance with a special operation and normally cannot be entered with an ordinary operation.

FIGS. 3A to 3F depict views illustrating examples of operation screens displayed by a Web browser of the PC 170 when the performance of a shutdown is instructed from an RUI of the image processing apparatus 100 according to the first embodiment. Description is given here regarding screen transitions when executing a shutdown through a network. The screen transitions illustrated here are an example, and thus do not limit the present invention.

Figure 3B:
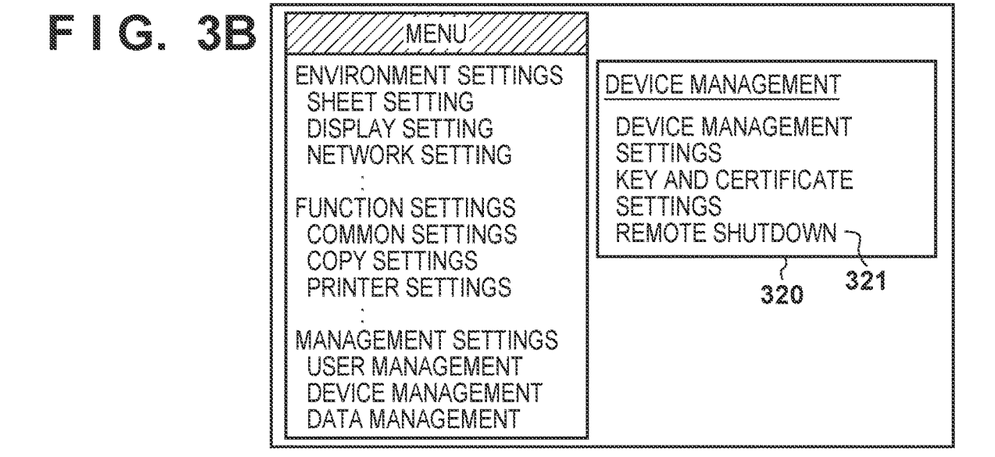
Figure 3C:
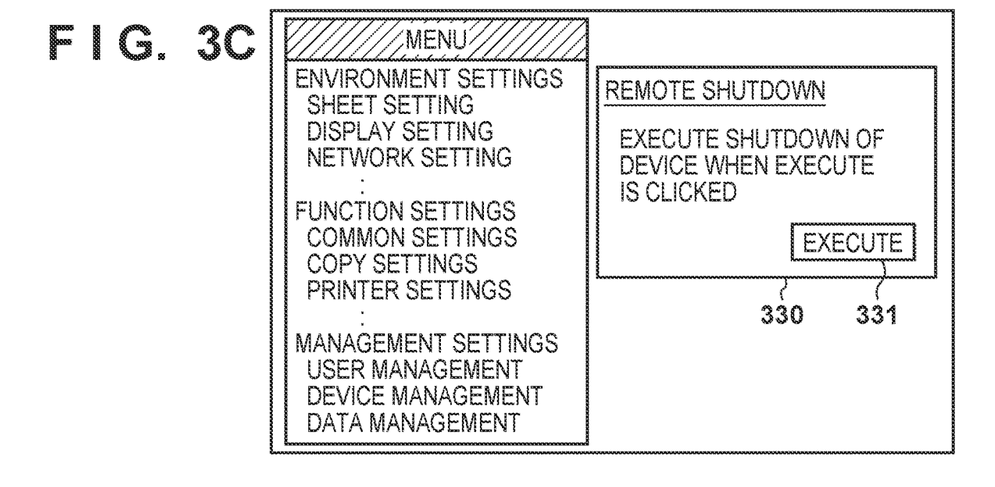

When a user designates and accesses the IP address of the image processing apparatus 100 from the Web browser, screen information of the RUI 300 of FIG. 3A is passed to the PC 170 as an HTTP response. At this time, the image processing apparatus 100 may perform login authentication. A menu 310 is displayed on a left portion of the RUI 300. In a case of executing a shutdown of the image processing apparatus 100 through the network from the PC 170, device management 311 is clicked. When the device management 311 is clicked, a device management dialog 320 of FIG. 3B is displayed on a right portion of the RUI 300. When a remote shutdown 321 is clicked on the device management dialog 320, a remote shutdown dialog 330 of FIG. 3C is displayed. When an execute button 331 is clicked on the remote shutdown dialog 330, a shutdown execution confirmation dialog 340 of FIG. 3D is displayed.

Figure 3D:
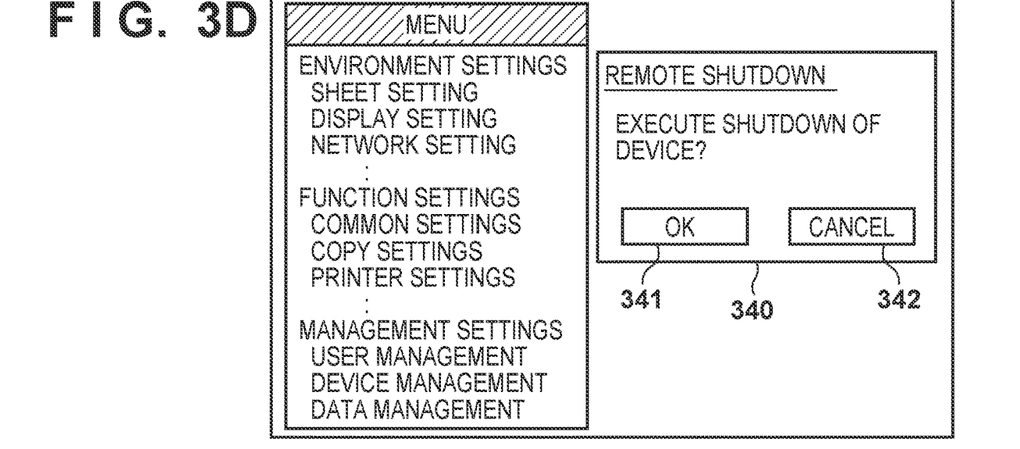
Figure 4:
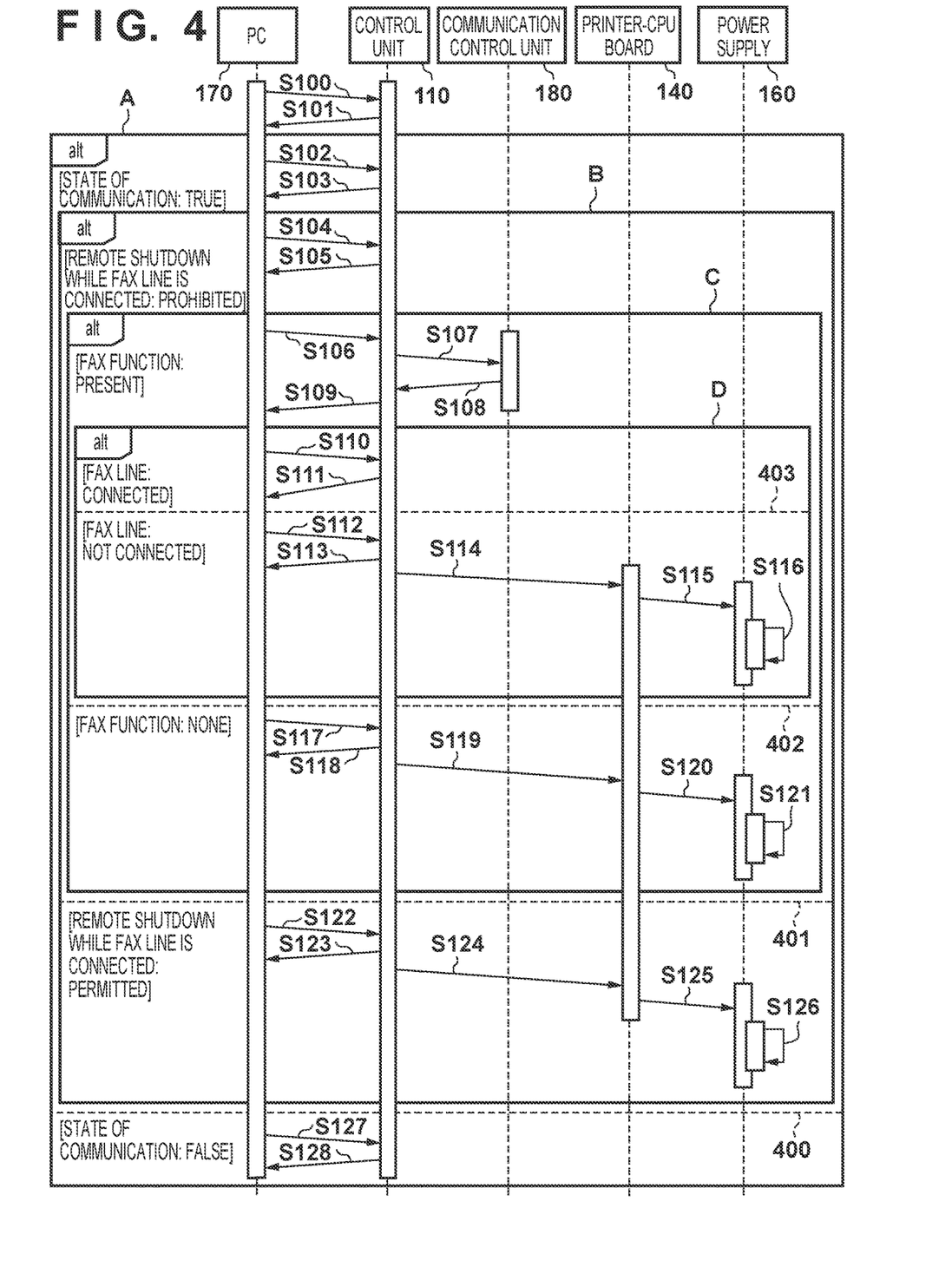
FIG. 4 is a sequence diagram for describing operation of a PC, a control unit, a communication control unit, a printer-CPU board, and a power supply when a remote shutdown of a device is instructed from an RUI according to the first embodiment.

FIG. 4 is a sequence diagram for describing operation of the PC 170, the control unit 110, the communication control unit 180, the printer-CPU board 140, and the power supply 160 when an OK button 341 for instructing a remote shutdown of a device is clicked on the execution confirmation dialog 340 of FIG. 3D. Reference symbols A to D of FIG. 4 represent condition branches.

Control of the image processing apparatus 100 is executed by, in the control unit 110, the CPU 111 executing a program, which has been deployed to the memory 113, as described above. The image processing apparatus 100 and the PC 170 are connected through a network so that HTTP communication is possible.

In step S100, the PC 170 queries the control unit 110 for the state of communication with the print engine 150. The CPU 111 of the control unit 110 which received the query from the PC 170 via the NIC 112, in step S101, transmits the state of communication with the print engine 150 as a reply to the PC 170.

In A of FIG. 4, a portion above a dashed line 400 represents a sequence when the state of communication with the print engine 150 is normal (TRUE), and a portion below the dashed line 400 represents a sequence when the state of communication with the print engine 150 is in error (FALSE).

Figure 3E:
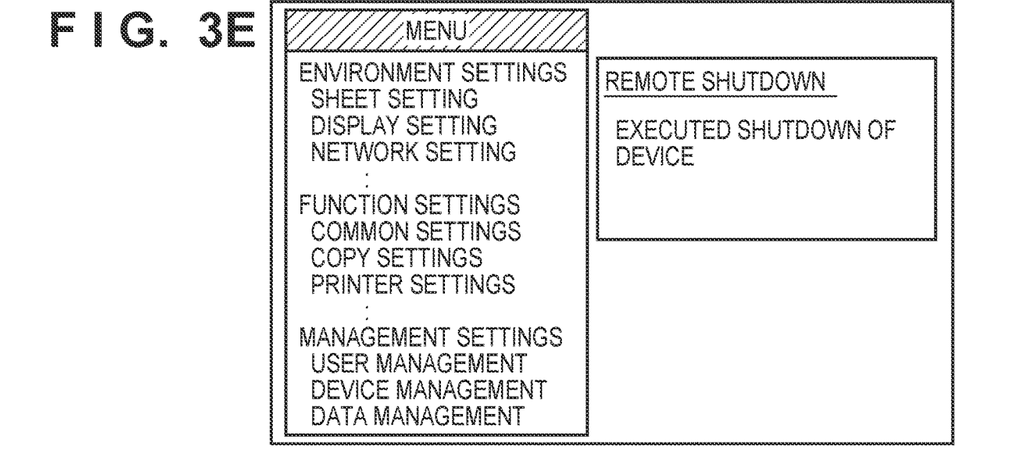
Figure 3F:
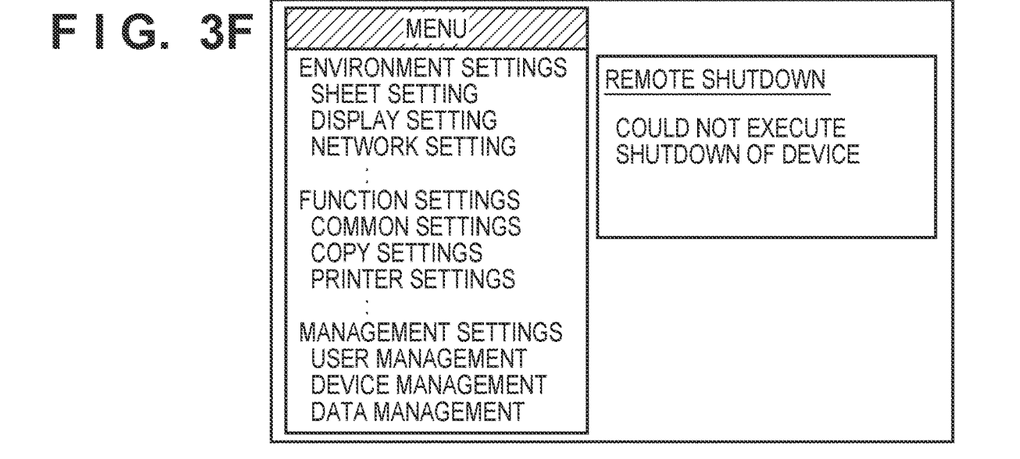

When the state of communication with the print engine 150 is in error, in step S127, a request for a screen displaying a message that a shutdown could not be performed is made from the PC 170 to the control unit 110. By this, in step S128, a corresponding screen is transmitted from the control unit 110 to the PC 170. As a result, a screen as illustrated by FIG. 3F, for example, is displayed on the Web browser of the PC 170 (on the RUI 300). In this case, a message that "shutdown of the device could not be executed" is displayed, and a shutdown of the image processing apparatus 100 is not performed.

In contrast, when the state of communication with the print engine 150 is normal, in step S102, a query as to whether a remote shutdown while a fax line is connected is permitted is made from the PC 170 to the control unit 110. In step S103, the control unit 110 returns a reply to the PC 170 based on the setting (stored in the memory 113) of FIG. 2C.

In B of FIG. 4, a portion above a dashed line 401 represents a sequence for when a remote shutdown while a fax line is connected is not permitted, and a portion below the dashed line 401 represents a sequence for when it is permitted.

When a remote shutdown while a fax line is connected is permitted, a shutdown of the image processing apparatus 100 is performed irrespective of the existence or absence of a fax function or a connection state of a fax line. In step S122, execution of a shutdown is requested from the PC 170 to the control unit 110, and, in step S123, a screen that displays a message that a shutdown has been performed is transmitted from the control unit 110 to the PC 170. As a result, a screen of FIG. 3E is displayed on the Web browser of the PC 170 (on the RUI 300). Next, in step S124, the CPU 111 executes the print engine communication program which is called by the RUI program, and conveys a shutdown request from the control unit 110 to the printer-CPU board 140 via the printer OF 117. In step S125, the CPU 141 of the printer-CPU board 140 executes the print engine control program, and upon receiving the shutdown request, the CPU 141 instructs the power supply control program to execute a shutdown.

The power supply 160 has a port for stopping supply of power from the power supply 160. In step S126, the CPU 141 executes the power supply control program to stop supply of power to the image processing apparatus 100 by operating the port of the power supply 160. By this, even if the image processing apparatus 100 is executing some kind of job, the image processing apparatus 100 will execute a shutdown and stop operating. By the above operation, supply of power to the image processing apparatus 100 is stopped, and the image processing apparatus 100 enters a powered off state.

Note that, configuration may be taken to, at this point, in step S124, convey the shutdown request to the printer-CPU board 140 after suspending or canceling a job that is being executed. When a shutdown is executed during execution of a job, there is a risk that a so-called jam will occur, where a sheet for printing gets stuck inside the image processing apparatus 100. When a jam occurs, a user must expend effort to remove the sheet that is the cause of the jam. In contrast to this, when a shutdown is executed after suspending or canceling jobs, a jam does not occur, and it is possible to greatly reduce effort for a user.

In contrast, when a remote shutdown while a fax line is connected is not permitted, in step S104, a query of the existence or absence of a fax function is made from the PC 170 to the control unit 110, and, in step S105, the existence or absence of the fax function is transmitted from the control unit 110 to the PC 170.

In C of FIG. 4, a portion above a dashed line 402 represents a sequence for when there is the fax function, and a portion below the dashed line 402 represents a sequence for when there is no fax function.

When there is no fax function, a shutdown of the image processing apparatus 100 is performed irrespective of the connection state of a fax line. Because step S117 to step S121 which indicate operation in this case are similar to operation for step S122 through step S126 which are described above, description thereof is omitted.

In contrast, if there is the fax function, in step S106, there is a query from the PC 170 to the control unit 110 as to whether or not a fax line is connected to the modular jack 181 of the communication control unit 180 such that transmission and reception are enabled. In step S107, the CPU 111 of the control unit 110 performs processing in accordance with a fax control program, and determines whether or not the fax line is currently connected to the communication control unit 180 via the fax I/F 118 such that transmission and reception are enabled. Here, because a voltage of −45V is supplied from the fax line, a potential difference occurs when the fax line is connected to the modular jack 181 such that transmission and reception are enabled. Specifically, the communication control unit 180 can, for example, examine the existence or absence of a positive/negative potential difference with the modular jack 181 to thereby determine whether or not the fax line is connected such that transmission and reception are enabled. In other words, the communication control unit 180 can determine whether or not data transmission and reception via the fax line is possible in accordance with a voltage applied to a connection means for connecting the fax line to the image processing apparatus 100. In step S108, a result of this determination is returned from the communication control unit 180 to the control unit 110, and, in step S109, whether or not the fax line is connected such that transmission and reception are enabled is conveyed from the control unit 110 to the PC 170.

In D of FIG. 4, a portion above a dashed line 403 represents a sequence for when the fax line is connected, and a portion below the dashed line 403 represents a sequence for when the fax line is not connected.

At D of FIG. 4, if the fax line is connected, a message that a shutdown could not be performed is displayed on the Web browser (the RUI 300) of the PC 170, and the shutdown is cancelled. Because step S110 and step S111 which indicate operation in this case are similar to operation for step S127 and step S128 which are described above, description thereof is omitted.

In contrast, if the fax line is not connected, the shutdown of the image processing apparatus 100 is performed. Because step S112 to step S116 which indicate operation in this case are similar to operation for step S122 through step S126 which are described above, description thereof is omitted.

In contrast, when the cancel button 342 on FIG. 3D is clicked, the screen transitions to the state of FIG. 3A. Note that, configuration may be taken to transition to the state of FIG. 3B or FIG. 3C when the cancel button 342 is clicked.

Note that, the menu 310 is displayed on the left portion of the RUI 300 in FIGS. 3A to 3E, and by clicking on an item of the menu 310, it is possible to cause the screen to transition to a dialog corresponding to the item, irrespective of which state of FIG. 3A to FIG. 3E had been entered.

In addition, at a time of a screen transition, the PC 170 queries the control unit 110 for the state of communication with the print engine 150. Configuration may be taken to, if it is not possible to execute a remote shutdown due to a communication error, gray out or hide the remote shutdown 321 of FIG. 3B, the execute button 331 of FIG. 3C and the OK button 341 of FIG. 3D to make them inoperable. Alternatively, configuration may be taken to, when there is a screen transition, perform the processing of the entirety of step S100 to step S109 of FIG. 4, and if a remote shutdown cannot be executed, gray out or hide the foregoing buttons to make them inoperable.

The embodiment can also be applied to a case where a shutdown request is transmitted through a network using another protocol, from an application installed on an external terminal, a Web application on a server, or the like. An SNMP (Simple Network Management Protocol) manager is known as an example of a representative application. An SNMP manager is an application for monitoring devices connected to a network by an SNMP command in accordance with a protocol that uses a Management Information Base (MIB) format.

The embodiment can also be applied to a case where a shutdown request is transmitted to the image processing apparatus 100 from an SNMP manager, in accordance with an SNMP command. The control unit 110 can distinguish what protocol is used for a command from the content of a packet that was sent through a network. For example, the control unit 110 analyzes a packet to distinguish that the packet is a shutdown request that was transmitted in accordance with SNMP.

Figure 5:
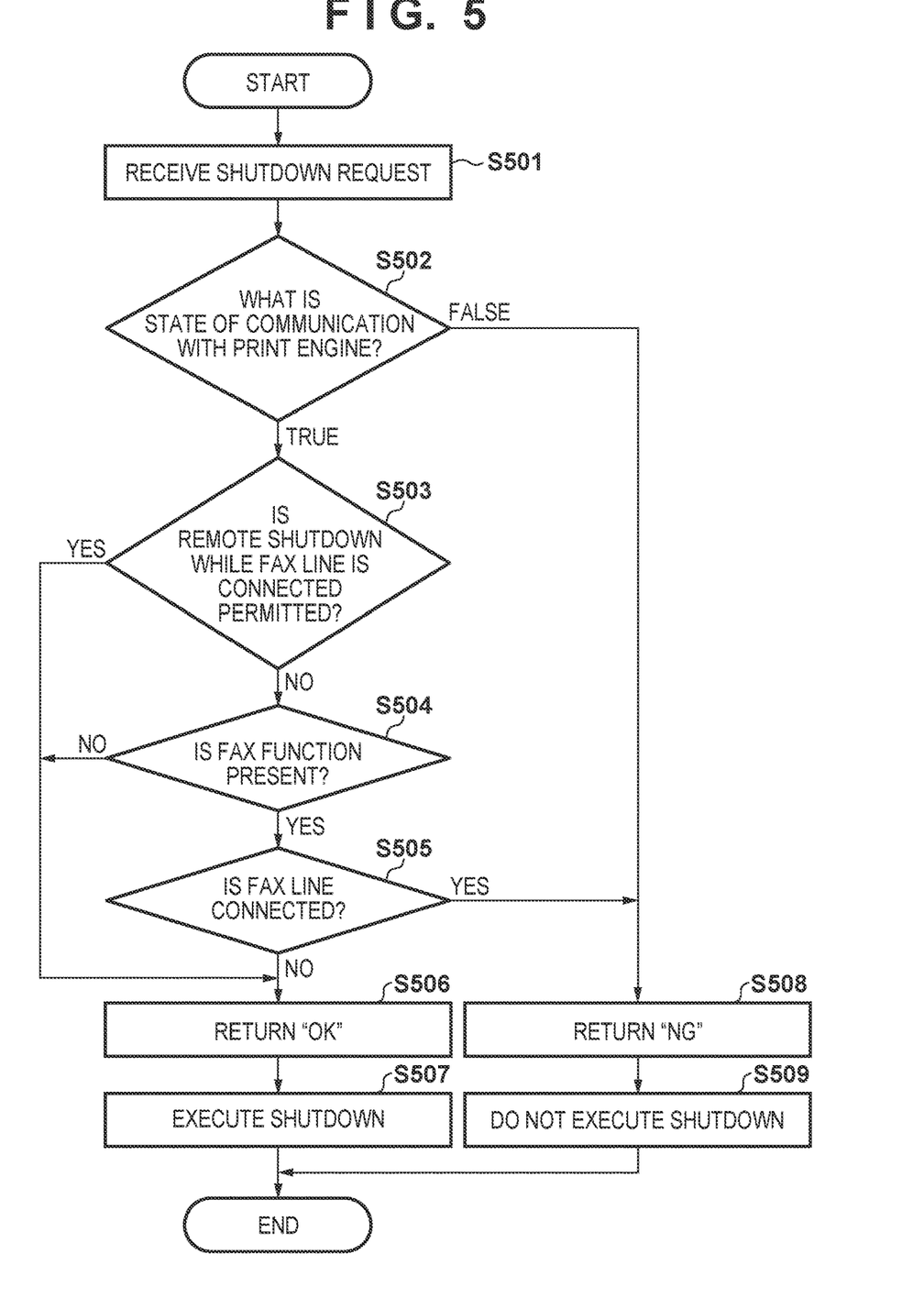
FIG. 5 is a flowchart for describing processing of a case where the image processing apparatus according to the first embodiment has received a shutdown request from a PC.

FIG. 5 is a flowchart for describing processing of a case where the image processing apparatus 100 according to the first embodiment has received a shutdown request from the PC 170. Processing illustrated by this flowchart is achieved by the CPU 111 executing a program that has been deployed into the memory 113. Operation of the inside of the image processing apparatus 100 (the control unit 110, the communication control unit 180, the printer-CPU board 140, and the power supply 160) at this point is as described by FIG. 4.

In step S501, the CPU 111 receives a shutdown request that was transmitted from the PC 170. The shutdown request is transmitted to the image processing apparatus 100 from the PC 170 by the OK button 341 being pressed on the screen of FIG. 3D, for example. Next, the processing proceeds to step S502, and the CPU 111 distinguishes the state of communication with the print engine 150, and, if the state of communication with the print engine 150 is in error (FALSE), the processing proceeds to step S508. In step S508, the CPU 111 transmits "NG" (no good) as a reply to the PC 170, the processing proceeds to step S509, and the processing ends without a shutdown being executed.

In contrast, if the state of communication with the print engine 150 is determined to be normal (TRUE) in step S502, the processing proceeds to step S503, and the CPU 111 determines, by referring to the memory 113, whether or not a remote shutdown while a fax line is connected has been permitted on the screen of FIG. 2C. If it is determined in step S503 that the remote shutdown while the fax line is connected is permitted, the processing proceeds to step S506, "OK" is returned to the PC 170 as a reply, and then in step S507 a shutdown is executed, and then this processing ends. A sequence for this shutdown is operation similar to that of step S124 to step S126 of FIG. 4.

In contrast, if the CPU 111 determines in step S503 that the remote shutdown while the fax line is connected is not permitted, the processing proceeds to step S504, and the CPU 111 determines the existence or absence of a fax function of the image processing apparatus 100. A fax function is a function for performing data transmission and reception via the fax line. If it determined here that there is no fax function, the processing proceeds to step S506, and the CPU 111 returns "OK" to the PC 170 as a reply, the processing proceeds to step S507, a shutdown is executed, and this processing ends.

In addition, if the CPU 111 determines in step S504 that there is the fax function, the processing proceeds to step S505, and the CPU 111 determines whether or not the fax line is currently connected such that transmission and reception are enabled. A sequence for determining whether or not the fax line is connected such that transmission and reception are enabled is operation similar to that of step S107 and step S108 of FIG. 4. If it is determined that the fax line is connected such that transmission and reception are enabled, the processing proceeds to step S508, "NG" is returned to the PC 170 as a reply, and the processing proceeds to step S509, and this processing ends without a shutdown being executed. In contrast, if it is determined in step S505 that the fax line is not connected such that transmission and reception are enabled, the processing proceeds to step S506, "OK" is returned to the PC 170 as a reply, and the processing proceeds to step S507, a shutdown is executed, and then this processing ends.

In the first embodiment, configuration is such that a reply of "OK" or "NG" is returned from the image processing apparatus 100 to the PC, but a reply does not need to be returned.

By virtue of the first embodiment as described above, if an image processing apparatus is being used to receive faxes, the image processing apparatus can be excluded as a target of a remote shutdown so that it is not shutdown unintentionally.

Second Embodiment

Next, explanation is given regarding a second embodiment of the present invention. Note that description regarding portions that are similar to those of the first embodiment is omitted.

Figure 6:
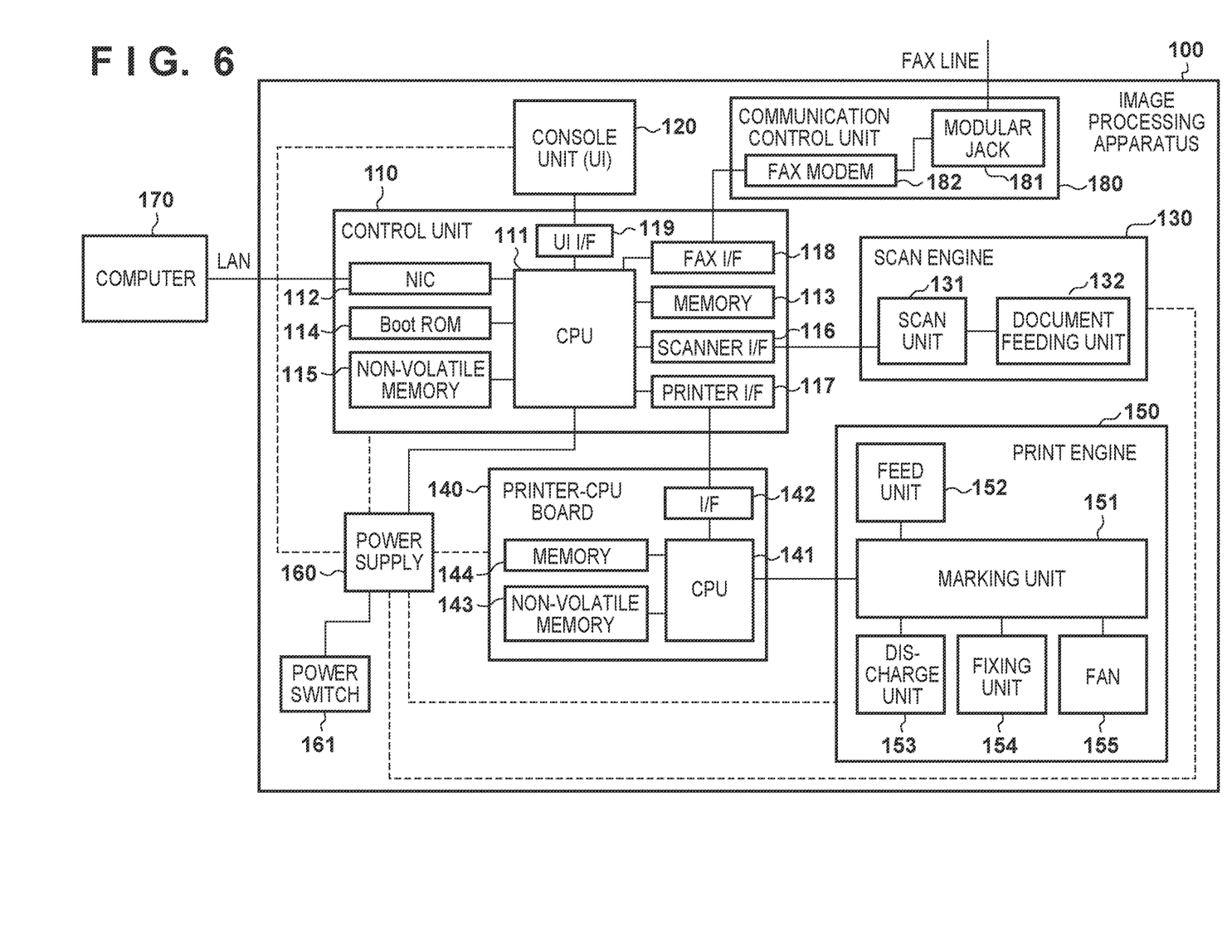
FIG. 6 is a block diagram for describing a configuration of hardware of an image processing apparatus according to a second embodiment.

FIG. 6 is a block diagram for describing a configuration of hardware of the image processing apparatus 100 according to the second embodiment. In FIG. 6, portions in common with the configuration of the image processing apparatus 100 according to the first embodiment described above are indicated by the same reference numerals, and description thereof is omitted. A difference between the second embodiment and the first embodiment is that control of supply of power such as on/off of the power supply 160 is executed by the CPU 111 of the control unit 110 and not the printer-CPU board 140. With such a configuration, it is possible to perform a shutdown of the image processing apparatus 100 from the control unit 110 even if a communication error has occurred between the control unit 110 and the printer-CPU board 140. Accordingly, when a shutdown request is sent through a network, there ceases to be a need to confirm the state of communication with the print engine.

In the image processing apparatus 100 according to the second embodiment, a function for setting whether or not to permit execution of a shutdown of the image processing apparatus 100 through a network while a fax line is connected is not provided. Being connected to the fax line is treated as though the image processing apparatus 100 is being used for fax reception, and remote shutdown is prohibited.

Operation and screen transitions on the RUI 300 are similar to that in the first embodiment, and description thereof is omitted.

Figure 7:
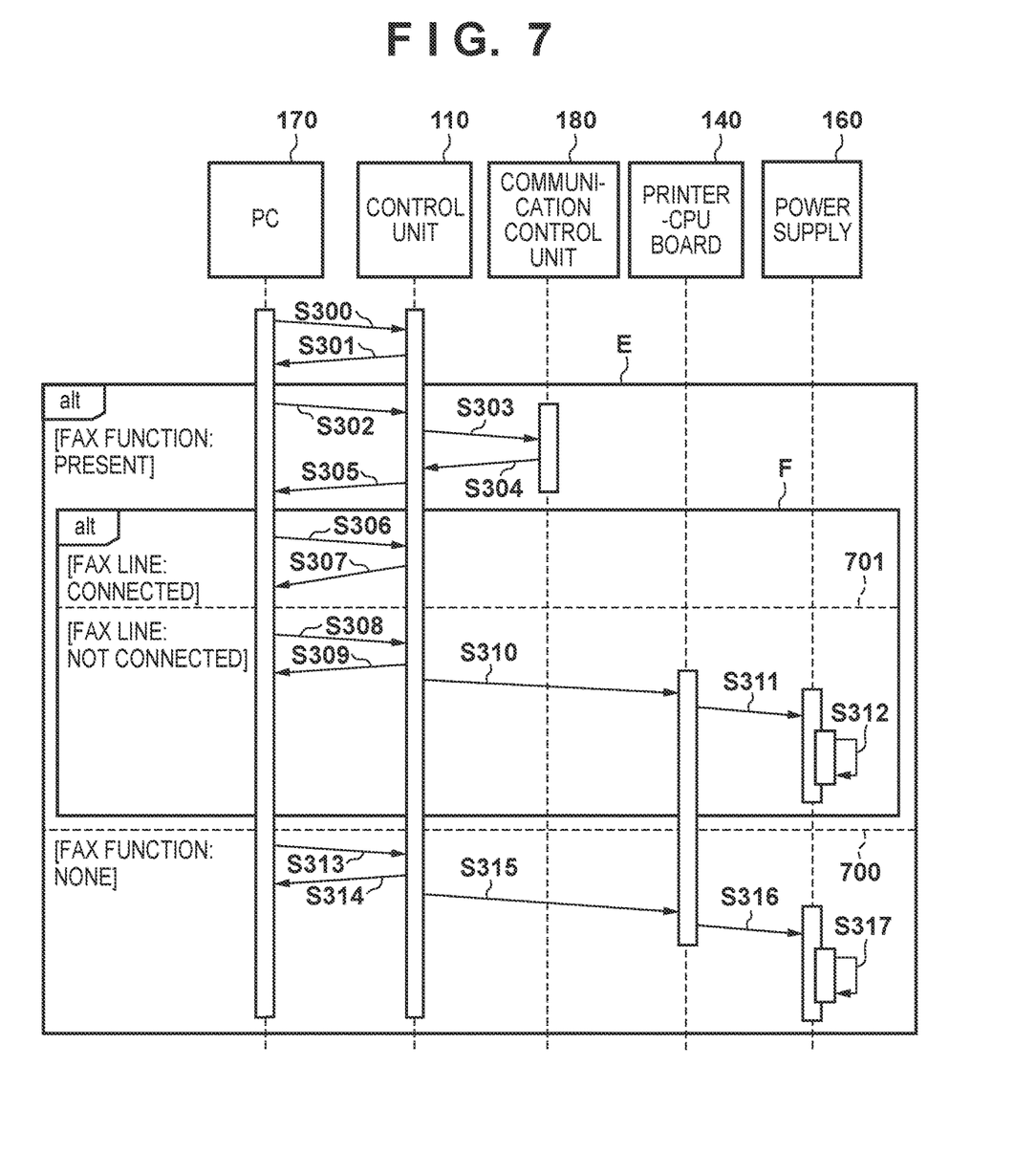
FIG. 7 is a sequence diagram for describing operation of a PC, a control unit, a communication control unit, a printer-CPU board, and a power supply when a remote shutdown of a device is instructed from an RUI according to the second embodiment.

FIG. 7 is a sequence diagram that illustrates operation of the PC 170, the control unit 110, the communication control unit 180, the printer-CPU board 140, and the power supply 160 when a shutdown is instructed from the RUI 300 of the PC 170, according to the second embodiment.

In step S300, a query as to the existence or absence of a fax function is made from the PC 170 to the control unit 110, and, in step S301, the existence or absence of a fax function is transmitted from the control unit 110 to the PC 170.

At E of FIG. 7, a portion above a dashed line 700 represents a sequence for when the image processing apparatus 100 has a fax function, and a portion below the dashed line 700 represents a sequence for when the image processing apparatus 100 does not have the fax function. When there is no fax function, a shutdown of the image processing apparatus 100 is performed irrespective of the connection state of a fax line. Because step S313 to step S317 which indicate operation in this case are similar to operation for step S122 through step S126 of FIG. 4, description thereof is omitted.

In contrast, if there is the fax function, in step S302, there is a query from the PC 170 to the control unit 110 as to whether or not the fax line is connected to the modular jack 181 of the communication control unit 180 such that transmission and reception are enabled. The operation of the subsequent step S303 to step S305 is similar to operation of step S107 to step S109 of FIG. 4, and thus description thereof is omitted.

In F of FIG. 7, a portion above a dashed line 701 represents a sequence for when the fax line is connected, and a portion below the dashed line 701 represents a sequence for when the fax line is not connected.

At F of FIG. 7, if the fax line is connected, a message that a shutdown could not be performed is displayed on the Web browser (the RUI 300) of the PC 170, and the shutdown is not executed. Because step S306 and step S307 which indicate operation in this case are similar to operation for step S127 and step S128 of FIG. 4, description thereof is omitted.

In contrast, if the fax line is not connected, the shutdown of the image processing apparatus 100 is performed. Because step S308 to step S312 which indicate operation in this case are similar to operation for step S122 through step S126 of FIG. 4, description thereof is omitted.

Figure 8:
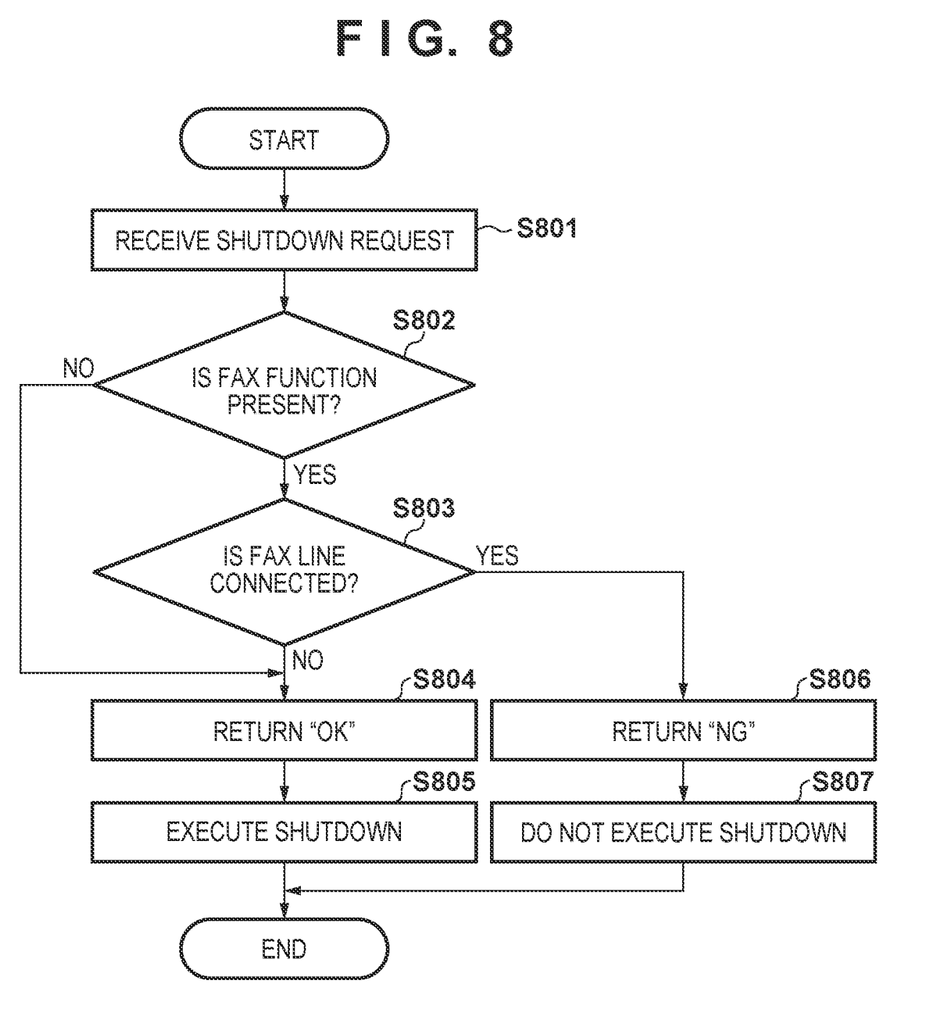
FIG. 8 is a flowchart for describing operation for a case where the image processing apparatus according to the second embodiment has received a shutdown request from a PC.

FIG. 8 is a flowchart for describing operation for a case where the image processing apparatus 100 according to the second embodiment has received a shutdown request from the PC 170. This flowchart represents operation of the image processing apparatus 100, and operation of internals thereof (the control unit 110, the communication control unit 180, the printer-CPU board 140, and the power supply 160) is as described by FIG. 7. Processing illustrated in FIG. 8 is something resulting from removing the processing for determining the state of communication with the print engine 150 (step S502) and processing for determining whether or not to set that a shutdown is permitted when a fax line is connected (step S503) from the flowchart of FIG. 5.

In step S801, the CPU 111 receives a shutdown request from the PC 170. Next, the processing proceeds to step S802, and the CPU 111 determines the existence or absence of a fax function. If it determined here that there is no fax function, the processing proceeds to step S804, and the CPU 111 returns "OK" to the PC 170 as a reply, and the processing proceeds to step S805, a shutdown is executed, and this processing ends. Note that a sequence for this shutdown is operation similar to that of step S313 to step S317 of FIG. 7.

In contrast, if the CPU 111 determines in step S802 that there is the fax function, the processing proceeds to step S803, and the CPU 111 determines whether or not the fax line is currently connected such that transmission and reception are enabled. A sequence for determining whether or not the fax line is connected such that transmission and reception are enabled is operation similar to that of step S303 and step S304 of FIG. 7, and thus description thereof is omitted. If it is determined that the fax line is connected such that transmission and reception are enabled, the processing proceeds to step S806, the CPU 111 returns "NG" to the PC 170, and, in step S807, a shutdown is not executed, and then this processing ends.

In contrast, if the CPU 111 determines in step S803 that the fax line is not connected so that transmission and reception is enabled, the processing proceeds to step S804, "OK" is returned to the PC 170, and the processing proceeds to step S805, a shutdown is executed, and then this processing ends.

By virtue of the second embodiment as described above, if an image processing apparatus is being used to receive faxes, the image processing apparatus can be excluded as a target of a remote shutdown so that it is not shutdown unintentionally.

Other Embodiments

Embodiments of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiments and/or that includes one or more circuits (e.g., application specific integrated circuit (ASIC)) for performing the functions of one or more of the above-described embodiments, and by a method performed by the computer of the system or apparatus by, for example, reading out and executing the computer executable instructions from the storage medium to perform the functions of one or more of the above-described embodiments and/or controlling the one or more circuits to perform the functions of one or more of the above-described embodiments. The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2018-094756, filed May 16, 2018, which is hereby incorporated by reference herein in its entirety.

What is claimed is:

1. An image processing apparatus capable of fax communication, comprising:
   a network interface that receives information from an external apparatus;
   a user interface that accepts a setting from a user;
   a controller, having at least one processor which executes instructions stored in a memory, one or more circuitry, or, a combination of the at least one processor and the one or more circuitry, being configured to:
   accept from a user, in advance of receiving by the network interface a shutdown request from the external apparatus, a setting of whether or not to perform shutdown processing based on the shutdown request received by the network interface when the image processing apparatus is in a state of being connected to a line for fax communication and when fax communication is possible; and
   execute, in accordance with the setting accepted in advance from the user by the user interface, the shutdown processing of the image processing apparatus based on the shutdown request received from the external apparatus.

2. The image processing apparatus according to claim 1, wherein
   the controller further determines whether or not the image processing apparatus is capable of fax communication, and
   in accordance with both the setting and a determination result of whether or not the image processing apparatus is capable of the fax communication, the controller executes the shutdown processing based on the received shutdown request received.

3. The image processing apparatus according to claim 2, further comprising:
   a fax communication interface that connects to the line for fax communication,
   wherein the controller determines whether or not the image processing apparatus is capable of the fax communication based on a voltage applied to the fax communication interface.

4. The image processing apparatus according to claim 1, further comprising:

a fax communication interface for connecting to the line for fax communication, wherein the controller determines whether or not a voltage is applied to the fax communication interface via the line, and execute, based on both the setting and the determination, the shutdown processing in accordance with the shutdown request received from the external apparatus.

5. The image processing apparatus according to claim 1, wherein the controller does not perform the shutdown processing even though the shutdown request is received from the external apparatus, based on the setting not to perform the shutdown processing even though the shutdown request is received, the processor.

6. A method of controlling an image processing apparatus capable of fax communication with an external apparatus, the method comprising:

accepting from a user, in advance of receiving a shutdown request for executing shutdown processing of the image processing apparatus from an external apparatus via a network, a setting of whether or not to perform the shutdown processing based on the shutdown request received when the image processing apparatus is in a state of being connected to a line for fax communication and when fax communication is possible; and receiving the shutdown request from the external apparatus via the network;

executing, in accordance with the setting accepted in advance from the user, the shutdown processing of the image processing apparatus based on the shutdown request received from the external apparatus.

* * * * *